(12) United States Patent
Kato et al.

(10) Patent No.: US 10,906,516 B2
(45) Date of Patent: Feb. 2, 2021

(54) BRAKE CONTROL SYSTEM

(71) Applicant: CENTRAL JAPAN RAILWAY COMPANY, Nagoya (JP)

(72) Inventors: Hirokazu Kato, Nagoya (JP); Gakuji Kobayashi, Nagoya (JP); Tomoya Kato, Nagoya (JP)

(73) Assignee: CENTRAL JAPAN RAILWAY COMPANY, Nagoya (JP)

( * ) Notice: Subject to any disclaimer, the term of this patent is extended or adjusted under 35 U.S.C. 154(b) by 125 days.

(21) Appl. No.: 16/115,847

(22) Filed: Aug. 29, 2018

(65) Prior Publication Data

US 2019/0061715 A1   Feb. 28, 2019

(30) Foreign Application Priority Data

Aug. 30, 2017  (JP) .................... 2017-165683

(51) Int. Cl.
*B60T 8/17*     (2006.01)
*B61H 11/14*   (2006.01)
(Continued)

(52) U.S. Cl.
CPC .............. *B60T 8/1705* (2013.01); *B60L 7/18* (2013.01); *B60L 7/26* (2013.01); *B60L 50/53* (2019.02); *B60T 1/10* (2013.01); *B60T 8/17616* (2013.01); *B61H 9/06* (2013.01); *B61H 11/005* (2013.01); *B61H 11/14* (2013.01); *B61H 13/34* (2013.01);
(Continued)

(58) Field of Classification Search
CPC ............... B60T 8/1705; B60T 2270/60; B60T 2270/10; B60T 1/10; B60T 8/17616; F16D 61/00; B61H 9/06; B61H 13/34; B61H 11/005; B61H 11/14; B60L 2240/12; B60L 2240/62; B60L 2200/26; B60L 50/53; B60L 7/18; B60L 7/26

See application file for complete search history.

(56) References Cited

U.S. PATENT DOCUMENTS 1,222,213 A  *  4/1917  Kelly ..................... B08B 3/024
                                                      134/172
2009/0125170 A1 * 5/2009 Noffsinger ................ B60L 7/16
                                                       701/20

(Continued)

FOREIGN PATENT DOCUMENTS

JP     2008-104343     5/2008

*Primary Examiner* — Navid Ziaeianmehdizadeh
(74) *Attorney, Agent, or Firm* — Grossman, Tucker, Perreault & Pfleger, PLLC (57) ABSTRACT

Provided is a brake control system that can reduce use of a mechanical braking in a railway vehicle using an automatic train control (ATC). The present disclosure is a brake control system for a railway vehicle using an ATC. The brake control system includes: a main electric motor, a main conversion device, a brake controller, and an ATC device. The main electric motor generates a braking force by converting kinetic energy of a wheel of the railway vehicle to electrical energy. The main conversion device actuates the main electric motor. The brake controller outputs a braking signal to the main conversion device. The ATC device outputs a braking command to the brake controller based on the ATC. In addition, the ATC device outputs a preliminary braking signal for energizing the main electric motor prior to output of the braking command.

20 Claims, 4 Drawing Sheets

(51) Int. Cl.
*B60T 8/1761* (2006.01)
*B61H 11/00* (2006.01)
*B60L 7/26* (2006.01)
*B60L 7/18* (2006.01)
*B61H 13/34* (2006.01)
*B61H 9/06* (2006.01)
*B60L 50/53* (2019.01)
*B60T 1/10* (2006.01)
*F16D 61/00* (2006.01)

(52) U.S. Cl.
CPC .......... *F16D 61/00* (2013.01); *B60L 2200/26* (2013.01); *B60L 2240/12* (2013.01); *B60L 2240/62* (2013.01); *B60T 2270/10* (2013.01); *B60T 2270/60* (2013.01)

(56) References Cited

U.S. PATENT DOCUMENTS

2016/0001756 A1* 1/2016 Konishi ................ B60T 13/665
 701/19
2018/0215270 A1* 8/2018 Yamamoto ................ B60L 3/00

* cited by examiner

BRAKE CONTROL SYSTEM

CROSS-REFERENCE TO RELATED APPLICATIONS

This application claims the benefit of Japanese Patent Application No. 2017-165683 filed on Aug. 30, 2017 with the Japan Patent Office, the entire disclosure of which is incorporated herein by reference.

BACKGROUND

The present disclosure relates to a brake control system.

Automatic train control (ATC) is widely used as a controller for a railway vehicle. The ATC is control that automatically decreases a speed of the railway vehicle. More specifically, the ATC automatically performs brake control if the railway vehicle over-speeds beyond a specific speed.

As with manual brake, the brake control in the ATC uses both a regenerative braking that converts kinetic energy to electrical energy; and a mechanical braking that mechanically generates a braking force (stopping force) (see, Japanese Unexamined Patent Application Publication 2008-104343).

SUMMARY

The mechanical braking to be used includes, in general, a brake pad and the like that make use of friction. Such a mechanical braking generates friction of a lining every operation of the mechanical braking, which results in a decreased service life of the mechanical braking. Furthermore, use of the mechanical braking reduces an amount of electrical energy collected through the regenerative braking, which interferes energy conservation.

In one aspect of the present disclosure, is it desirable to provide, in a railway vehicle using automatic train control, a brake control system that can reduce use of a mechanical braking.

One aspect of the present disclosure is a brake control system for a railway vehicle using automatic train control. The brake control system comprises: a main electric motor, a main conversion device, a brake controller, and an ATC device. The main electric motor generates a braking force by converting kinetic energy of a wheel of the railway vehicle to electrical energy. The main conversion device actuates the main electric motor. The brake controller outputs a braking signal to the main conversion device. The ATC device outputs a braking command to the brake controller based on the automatic train control. In addition, the ATC device outputs, prior to output of the braking command, a preliminary braking signal for energizing the main electric motor.

With such a configuration, it is possible to energize the main electric motor prior to the output of the braking command. As a result, a braking force obtained through a regenerative braking is immediately generated in response to the output of the braking command. In conventional brake control, it is unavoidable to use a mechanical braking until the regenerative braking is activated. In contrast, the brake control system of the present disclosure enables braking through the regenerative braking immediately after the output of the braking command. Thus, it is possible to reduce use of the mechanical braking.

In one aspect of the present disclosure, the ATC device may calculate, in order to output the preliminary braking signal, a time, a distance, or a speed of the railway vehicle traveled until output of the braking command by using a present location and a speed of the railway vehicle. With such a configuration, it is possible to activate the regenerative braking at a more proper time. Consequently, it is possible to further reduce the use of the mechanical braking.

In one aspect of the present disclosure, the ATC device may output a braking command that is based on a braking pattern in which deceleration occurring near a section is designed to have a magnitude capable of collecting electric power generated by the main electric motor during passage of the railway vehicle through the section, the section serving to transition a power-feeding system for the railway vehicle. Such a configuration reduces regenerative electric power, thus enabling the regenerative braking to be used during the passage of the railway vehicle through the section. Consequently, it is possible to further reduce the use of the mechanical braking while charging the regenerative electric power to an on-vehicle battery and the like. Also, it is possible to enhance on-board comfortableness of the railway vehicle.

In one aspect of the present disclosure, the brake control system may further comprise at least one of a wheel tread cleaner or a ceramic injector. Further, the wheel tread cleaner and the ceramic injector my start respective operations based on the preliminary braking signal. With such a configuration, it is possible to reduce skidding of the wheel immediately after the output of the braking command. Continuing skidding involves shifting from the regenerative braking to the mechanical braking. Thus, if the skidding can be reduced, reduction in shifting the regenerative braking to the mechanical braking is also possible. Furthermore, reduction of the skidding can lead to reduction in a braking distance caused by the braking.

BRIEF DESCRIPTION OF THE DRAWINGS

An example embodiment of the present disclosure will be described hereinafter by way of example with reference to the accompanying drawings, in which.

DETAILED DESCRIPTION

1. First Embodiment

[1-1. Configuration]

Figure 1:
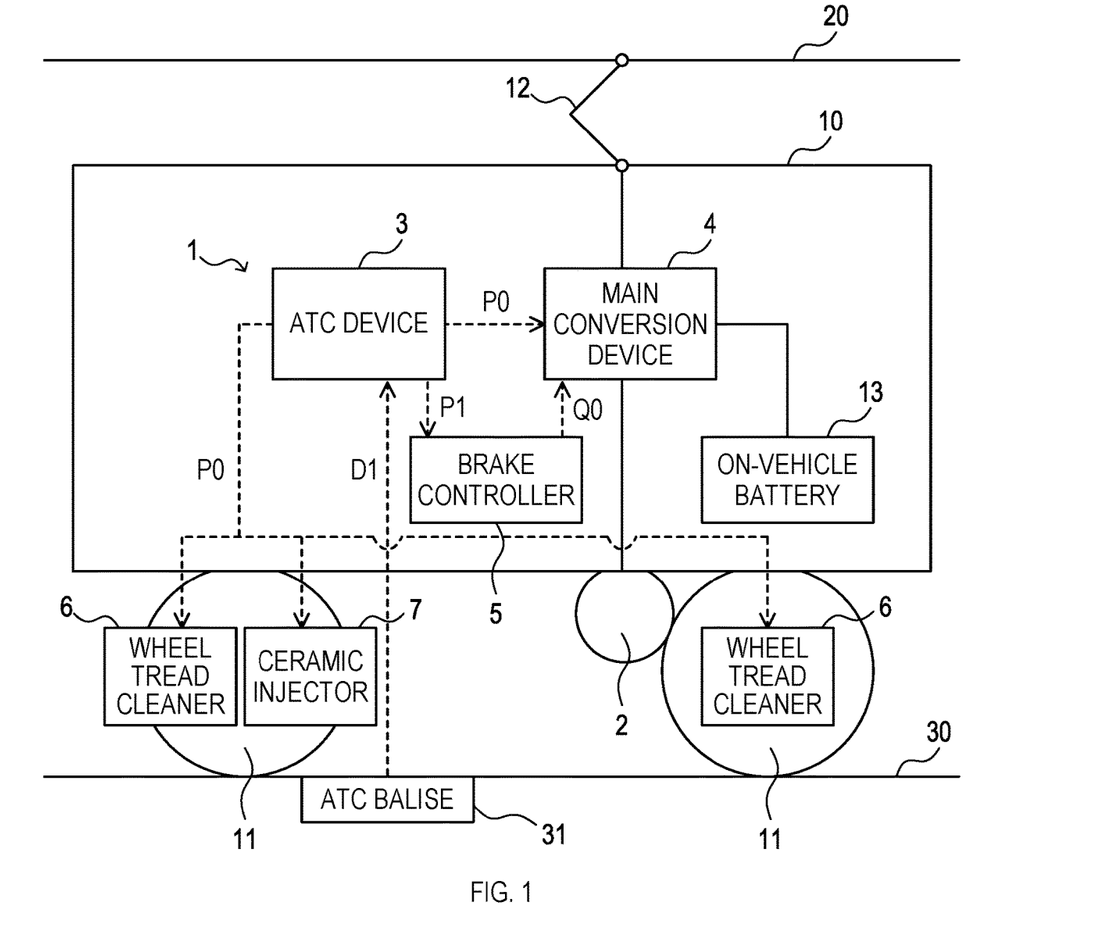
FIG. 1 is a block diagram schematically showing a configuration of a brake control system of an embodiment.

A brake control system 1 shown in FIG. 1 is a brake control system that is installed in a railway vehicle using automatic train control (ATC). The brake control system 1 comprises at least one of: a main electric motor 2, an ATC device 3, a main conversion device 4, a brake controller 5, a wheel tread cleaner 6, and a ceramic injector. The railway vehicle to which the brake control system of the present disclosure is mounted may be composed of a single vehicle. In general, however, the railway vehicle is composed of multiple vehicles.

In the railway vehicle composed of multiple vehicles, the main electric motor 2 of the brake control system 1 is installed in each vehicle 10. The main conversion device 4 is installed in each vehicle 10 or installed in some of the vehicles 10. In contrast, the ATC device 3 is generally situated only in the vehicle 10 that is a lead vehicle. The ATC device 3 outputs respective signals to the main conversion device 4 and the brake controller 5 of each vehicle 10.

The vehicle 10 comprises wheels 11, a pantograph 12, and an on-vehicle battery 13 in addition to the brake control system 1. The vehicle 10 is supplied with electric power from an overhead line 20 via the pantograph 12. The vehicle 10 uses the electric power to drive the wheels 11, to thereby travel on a track 30.

Specifically, a converter of the main conversion device 4 converts an alternating current power transmitted from the overhead line 20 to a direct current, which is further converted to a three-phase alternating current by an inverter of the main conversion device 4. The three-phase alternating current drives the main electric motor 2 that transmits power to the wheels 11. The main electric motor 2 is also used as a power generator during a regenerative braking.

<Main Electric Motor>

The main electric motor 2 generates a braking force (stopping force) by converting kinetic energy of the wheels 11 of the railway vehicle to electrical energy. The braking force decreases a shaft speed of the wheels 11.

Specifically, the main electric motor 2 is used as the power generator to generate electricity by rotation of the wheels 11 of the vehicle 10. As a result, the main electric motor 2 serves as a load against rotation of the wheels 11, thus reducing the shaft speed of the wheels 11.

Further, the main conversion device 4 controls an amount of electric power generated by the main electric motor 2, to thereby control the braking force of a brake. In other words, as the load is increased due to increase in the amount of the electric power to be generated, the braking force is increased; and as the load is decreased due to decrease in the amount of the electric power to be generated, the braking force is decreased.

The electric power generated by the main electric motor 2 is carried back to the overhead line 20 via the main conversion device 4 and the pantograph 12. Furthermore, in a section where a power-feeding system for the railway vehicle is transitioned (power system-transitioning section), power transmission to the overhead line 20 is unavailable. Regenerative electric power is therefore charged to a capacitor that is placed in a direct current intermediate circuit of the main conversion device 4 and to the on-vehicle battery 13.

For this reason, it is preferable that the capacitor of the main conversion device 4 and the on-vehicle battery 13 are designed to have respective capacities capable of collecting the electric power generated by the main electric motor 2 during passage of the railway vehicle through the section. This allows the regenerative braking to be continuously used during the passage of the railway vehicle through the section. By combining with modification to a brake pattern discussed below, the regenerative braking is further allowed to be usable during the passage of the railway vehicle through the section even where the respective capacities of the on-vehicle battery 13 and the like are small. Consequently, it is possible to avoid use of a mechanical braking.

<ATC Device>

The ATC device 3 serves to output a braking command to the brake controller 5 based on a known ATC. Specifically, the ATC device 3 outputs a braking command P1 to the brake controller 5. In response to input of the braking command P1, the brake controller 5 transmits a braking signal Q0 to the main conversion device 4, and then the main conversion device 4 actuates the main electric motor 2.

The ATC device 3 includes a CPU, a ROM, a RAM, and an external storing device. The external storing device of the ATC device 3 stores a database of the power system-transitioning section and the like. The database of the power system-transitioning section records a location data of the power system-transitioning section.

The ATC device 3 identifies a present location of the vehicle 10 based on a location data of a ATC balise 31 located on the ground and a speed data of the vehicle 10. The speed data of the vehicle 10 is obtained by a tachogenerator that serves to detect the speed of the vehicle 10.

The ATC balise 31 is buried in-between two rails of the track 30. In response to passage of the railway vehicle above the ATC balise 31, the ATC balise 31 transmits a location data D1 thereof to the ATC device 3.

Based on the present location and the speed data of the vehicle 10 that are identified in the above-described process, the ATC device 3 outputs the braking command P1 to the brake controller 5 where the speed of the vehicle 10 reaches an acceptable value or more; or a distance from the preceding train reaches an acceptable value or less, for example.

Further, the ATC device 3 outputs, prior to output of the braking command P1, a preliminary braking signal P0 for energizing the main electric motor 2 to the main conversion device 4. The main conversion device 4 in which the preliminary braking signal P0 is inputted then energizes the main electric motor 2.

The preliminary braking signal P0 is outputted at a time: preceding the output of the braking command P1 by a specific time; before a distance of the railway vehicle traveled to a location where the braking command P1 is to be outputted (command output location) reaches a specific distance or less; or before the speed of the vehicle 10 traveled to the command output location reaches a specific speed or less. A time between occurrence the preliminary braking signal P0 and occurrence of the braking command P1 (hereinafter, referred to as a "preceding time") is set to be more than a time required for activating the regenerative braking, in other words, for energizing the main electric motor 2. Here, activation of the regenerative braking takes about one to two seconds.

Where the preliminary braking signal P0 is outputted at the time preceding the output of the braking command P1 by the specific time, the ATC device 3 calculates, in order to output the preliminary braking signal P0, the preceding time until output of the braking command P1 by using the present location and the speed of the vehicle 10. Specifically, the ATC device 3 identifies: an ATC braking pattern; an estimated commanding time in which the braking command P1 is outputted based on an identified present location and a speed data of the vehicle 10; and the above-mentioned preceding time. The ATC device 3 then outputs the preliminary braking command P0 at a time acquired by subtracting the preceding time from the estimated commanding time.

Where the preliminary braking signal P0 is outputted at the time before the distance of the railway vehicle traveled to the command output location reaches the specific distance or less, the ATC device 3 calculates, in order to output the preliminary braking signal P0, the distance based on the ATC braking pattern and the present location and the speed of the vehicle 10.

In the present embodiment, an area designed to apply the ATC braking pattern may include the power system-transitioning section. In this case, the ATC device 3 creates a modified braking pattern in which deceleration occurring near the section is decreased and outputs the braking command P1, which is based on the modified braking pattern, to the brake controller 5. The modified braking pattern is one that is adjusted so that the amount of the electric power generated by the main electric motor 2 during the passage of the railway vehicle through the section is collectable in the capacitor of the main conversion device 4 and the on-vehicle battery 13.

<Main Conversion Device>

The main conversion device 4 controls the main electric motor 2 based on the braking signal Q0 that is inputted from the brake controller 5.

Specifically, in response to input of the preliminary braking signal P0 from the ATC device 3, the main conversion device 4 energizes the main electric motor 2. In other words, electric current flows into a coil of the main electric motor 2 to thereby enable the main electric motor 2 to generate the electric power. Upon completion of energization, the main conversion device 4 is ready to output the regenerative electric power (in other words, regeneration is available).

In response to receipt of the preliminary braking signal P0, the braking signal Q0 is inputted from the brake controller 5 to the main conversion device 4. In response to this, the main conversion device 4 controls the amount of the electric power generated by the main electric motor 2. As a result, a load is applied on rotation of the main electric motor 2, which generates the braking force on the wheels 11. In addition, the main electric motor 2 functions as the power generator and then the electric power is collected.

<Wheel Tread Cleaner and Ceramic Injector>

The wheel tread cleaner 6, which is provided to each wheel 10 of the vehicle 10 in the present embodiment, removes dirt and the like attached to a wheel tread of the wheel 11 by abutment of an abrasive element against the wheel tread. Cleaning assures roughness on the wheel tread, which increases frictional coefficient between the track 30 and the wheel 11.

The ceramic injector 7 injects ceramic powder between the track 30 and the wheel 11. Injection of the ceramic powder increases the frictional coefficient between the track 30 and the wheel 11. Increase in the frictional coefficient results in reduced skidding during braking.

In the present embodiment, the wheel tread cleaner 6 and the ceramic injector 7 start respective operations based on the preliminary braking signal P0 from the ATC device 3. Specifically, in response to the input of the preliminary braking signal P0, the wheel tread cleaner 6 brings the abrasive element into abutment with the wheel 11. Further, in response to the input of the preliminary braking signal P0, the ceramic injector 7 starts injecting the ceramic powder.

[1-2. Process]

A process performed by the brake control system 1 will be described below with reference to respective flow diagrams of FIG. 2, FIG. 3, and FIG. 4.

<Operation of ATC Braking>

Figure 2:
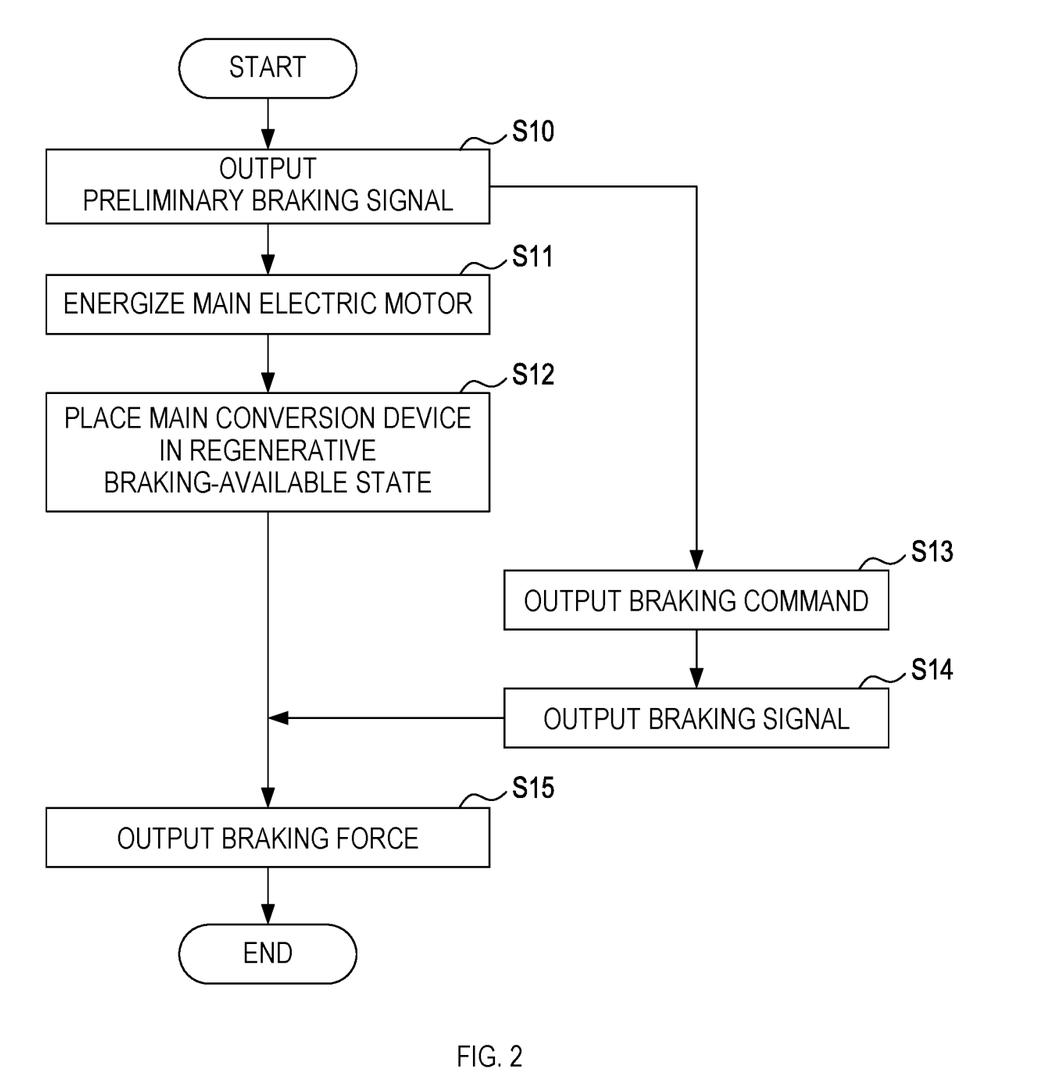
FIG. 2 is a flow diagram schematically showing a process performed by the brake control system of FIG. 1.

In operation of the ATC braking shown in FIG. 2, the ATC device 3 first outputs, prior to the output of the braking command P1, the preliminary braking signal P0 to the main conversion device 4 (Step S10).

In response to the input of the preliminary braking signal P0 from the ATC device 3, the main conversion device 4 energizes the main electric motor 2 (Step S11). Subsequently, the main conversion device 4 is placed in a regenerative braking-available state (Step S12).

After outputting the preliminary braking signal P0, the ATC device 3 outputs the braking command P1 based on the ATC (Step S13). In response to the input of the braking command P1 in the brake controller 5, the brake controller 5 outputs the braking signal Q0 to the main conversion device 4, which is placed in the regenerative braking-available state (Step S14). The main conversion device 4 in which the braking signal Q0 is inputted controls the main electric motor 2 based on the braking signal Q0, and then the main electric motor 2 outputs the braking force (Step S15).

Here, the operation of the ATC braking in FIG. 2 does not require the use of the mechanical braking and therefore, it is possible to brake by the main electric motor 2 alone. Note that the mechanical braking is a brake that mechanically reduces the rotation of the wheel 11, such as a wheel-tread brake and a disc brake.

<Operation of ATC Braking During Passage of Railway Vehicle Through Section>

In the operation of the ATC braking in FIG. 2, the area designed to apply the ATC braking pattern may include the section. In this case, operation of the ATC braking shown in FIG. 3 is performed. Here, steps in FIG. 3: S10, S11, S12, S13, S14, and S15 are identical with respective steps in FIG. 2.

Figure 3:
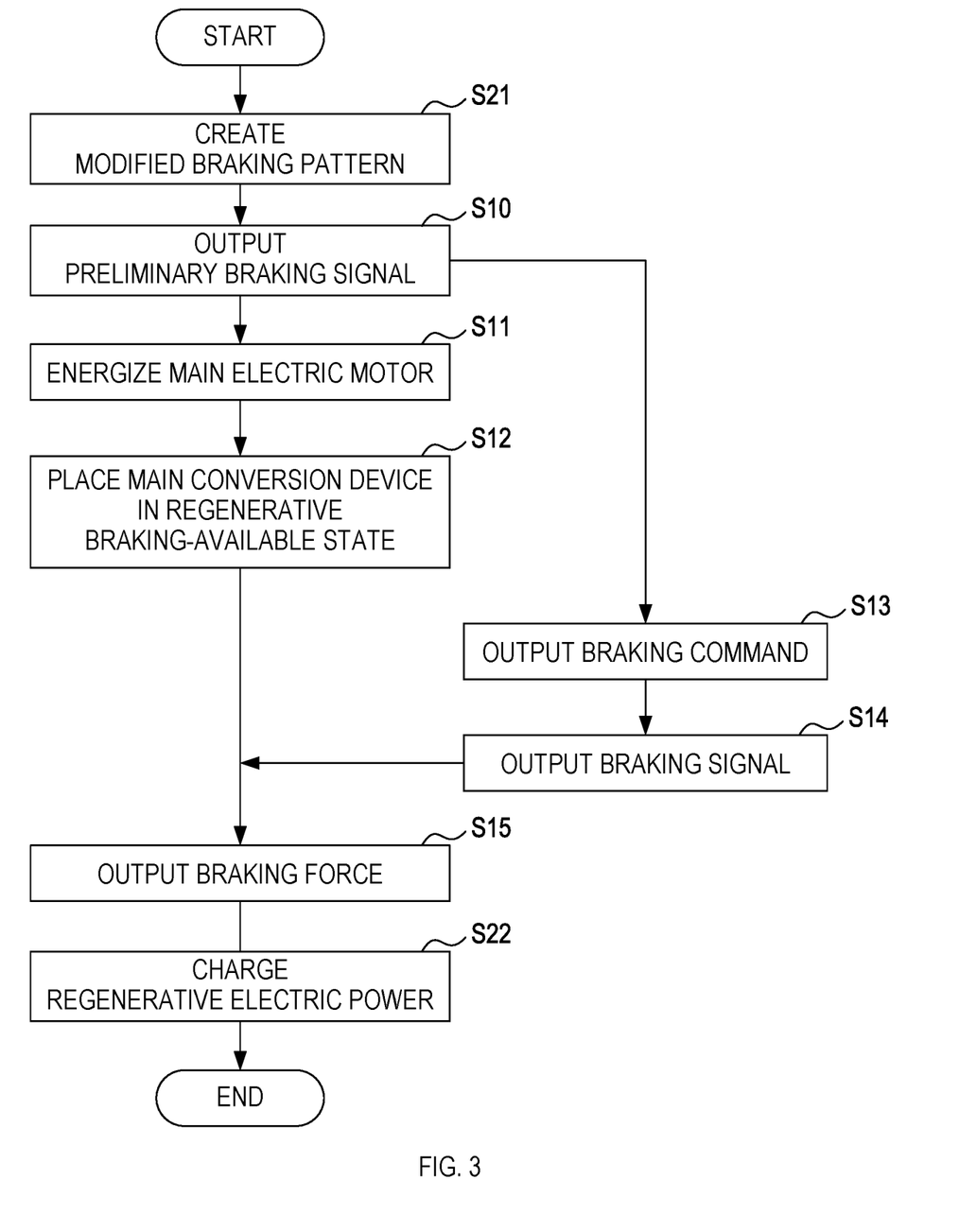
FIG. 3 is a flow diagram schematically showing a process performed by the brake control system of FIG. 1 during passage of a railway vehicle through a section.

In a process shown in FIG. 3, the ATC device 3 creates the modified braking pattern in which the deceleration occurring near the section is decreased, and outputs the braking command P1 to the brake controller 5 based on the modified braking pattern (Step S21). The brake controller 5 in which the braking command P1 is inputted in consideration of the modified braking pattern then outputs the braking signal Q0 to the main conversion device 4 based on the braking command P1 (Step S14). The main conversion device 4 in which the braking signal Q0 is inputted controls the main electric motor 2, and then the main electric motor 2 outputs the braking force (Step S15). Further, the main conversion device 4 charges the regenerative electric power from the main electric motor 2 to the capacitor of the main conversion device 4 or to the on-vehicle battery 13 (Step S22).

<Respective Operations of Wheel Tread Cleaner and Ceramic Injector>

Figure 4:
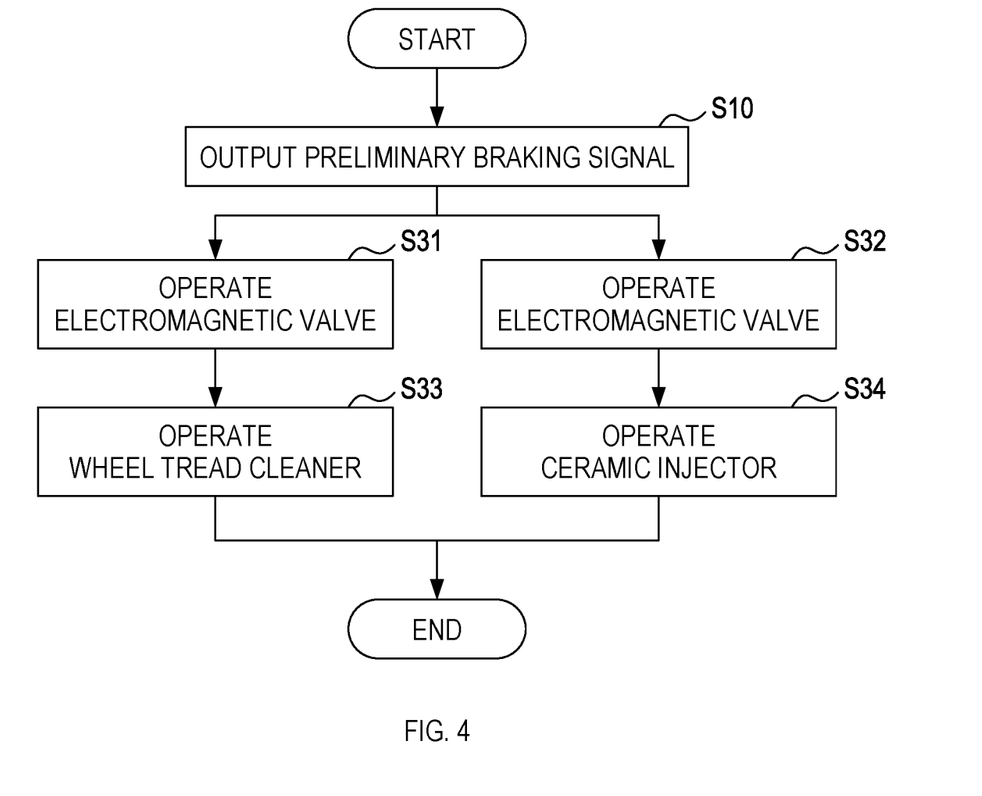
FIG. 4 is a flow diagram schematically showing a process performed by the brake control system of FIG. 1 with respect to a wheel tread cleaner and a ceramic injector.

Hereinafter described with reference to FIG. 4 is respective operations of the wheel tread cleaner 6 and the ceramic injector 7 that are performed concurrently with the operation of the ATC braking in FIG. 2.

Prior to the output of the braking command P1, the ATC device 3 outputs the preliminary braking signal P0 (Step S10). In response to this, respective electromagnetic valves of the wheel tread cleaner 6 and the ceramic injector 7 are brought into operation (Step S31 and Step S32).

As a result of operations of the respective electromagnetic valves, the abrasive element in the wheel tread cleaner 6 is brought into abutment with the wheel 11 (Step S33). The ceramic injector 7 injects the ceramic powder (Step S34). These steps precede the output of the braking command P1.

[1-3. Effects]

The above-detailed embodiment can provide the following effects.

(1a) The preliminary braking signal P0 enables the main electric motor 2 to be energized prior to the output of the braking command P1. This allows immediate generation of the braking force by the main electric motor 2 in response to the output of the braking command P1. Consequently, it is possible to brake by the main electric motor 2 immediately after the output of the braking command P1. Thus, it is possible to reduce the use of the mechanical braking.

(1b) In order to output the preliminary braking signal P0, the ATC device 3 calculates the time, the distance, or the speed of the railway vehicle traveled until the output of the braking command P1 using the present location and the speed of the railway vehicle. This enables the regenerative braking to be activated at a more proper time. Consequently, it is possible to further reduce the use of the mechanical braking.

(1c) The ATC device 3 outputs the modified braking pattern in which the deceleration occurring near the section for transitioning the power-feeding system for the railway vehicle is decreased. This enables the regenerative braking to be used during the passage of the railway vehicle through the section. Accordingly, frequency in shifting between the regenerative braking and the mechanical braking is reduced, which enhances on-board comfortableness. In addition, since the electric power charged to the battery and the like is increased, energy conservation is enhanced.

(1d) The wheel tread cleaner 6 and the ceramic injector 7 starts the respective operations based on the preliminary braking signal P0. A time lag between start of these devices and appearance of respective effects of these devices is therefore canceled by the time between the occurrence of the preliminary braking signal P0 and the occurrence of the braking command P1. Consequently, it is possible to reduce skidding of the wheel 11 immediately after the output of the braking command P1. In addition, reduction of the skidding can lead to reduction of a braking distance (stopping distance) caused by the brake.

2. Other Embodiments

Accordingly, the embodiment of the present disclosure has been described; however, the present disclosure is not limited to the aforementioned embodiment and can take various forms.

(2a) In the brake control system 1 according to the aforementioned embodiment, the time at which the preliminary braking signal P0 is outputted is not necessarily calculated by using the present location and the speed of the railway vehicle. Therefore, the time at which the preliminary braking signal P0 is outputted may be determined by other process(es).

(2b) In the brake control system 1 according to the aforementioned embodiment, the ATC device 3 does not necessarily create the modified braking pattern in which the deceleration occurring near the section for transitioning the power-feeding system for the railway vehicle is decreased. Therefore, even where the area designed to apply the ATC braking pattern includes the section, the braking command P1, which is based on the ATC braking pattern, may be outputted.

(2c) The brake control system 1 according to the aforementioned embodiment does not necessarily comprise the wheel tread cleaner 6 and the ceramic injector 7. Therefore, only either one of the wheel tread cleaner 6 or the ceramic injector 7 may be used or none of them may be used. Further, the wheel tread cleaner 6 and the ceramic injector 7 may conventionally start the respective operations based on the braking command P1.

(2d) In the brake control system 1 according to the aforementioned embodiment, both the regenerative braking and the mechanical braking may be used. In this case, the brake controller 5 outputs the braking signal Q0 to the mechanical braking as well.

The function(s) performed by a single element in the aforementioned embodiments may be performed by multiple elements. The function(s) performed by multiple elements may be performed by a single element. Part of the configuration of the aforementioned embodiments may be omitted. At least part of the configuration of the aforementioned embodiments may be added to or replaced by the configuration of the aforementioned other embodiments. All modes included in the technical idea identified from recitations in the accompanying claims are embodiments of the present disclosure.

What is claimed is:

1. A brake control system for a railway vehicle using automatic train control comprising:
   a main electric motor that generates a braking force by converting kinetic energy of a wheel of the railway vehicle to electrical energy;
   a main conversion device comprising a controller configured to adjust an amount of electric power generated by the main electric motor, to thereby control a regenerative braking force of the main electric motor;
   a brake controller configured to output a braking signal to the main conversion device; and
   an automatic train control (ATC) device configured to output a braking command to the brake controller based on the automatic train control, the braking command configured to cause the brake controller to output the braking signal, wherein the ATC device is further configured to output a preliminary braking signal to the main conversion device to cause the main electric motor to energize for regenerative braking prior to the braking command being output.

2. The brake control system according to claim 1, wherein the ATC device calculates, in order to output the preliminary braking signal, a time, a distance, or a speed of the railway vehicle travelled until output of the braking command by using a present location and a speed of the railway vehicle.

3. The brake control system according to claim 1, wherein the ATC device outputs a braking command that is based on a braking pattern in which deceleration occurring near a power system-transitioning section is designed to have a magnitude capable of collecting electric power generated by the main electric motor during passage of the railway vehicle through the power system-transitioning section, wherein the power system-transitioning section is a transition from a first power-feeding system to a second power-feeding system for the railway vehicle.

4. The brake control system according to claim 1, wherein the brake control system further comprises at least one of a wheel tread cleaner or a ceramic injector; and
   wherein the wheel tread cleaner or the ceramic injector start respective operations based on the preliminary braking signal.

5. The brake control system according to claim 1, wherein the preliminary braking signal is outputted at a time:
   preceding the output of the braking command by a specific time;
   before a distance of the railway vehicle travelled to a command output location where the braking command is to be outputted reaches a specific distance or less; or
   before the speed of the vehicle travelled to the command output location reaches a specific speed or less.

6. The brake control system according to claim 1,
   wherein the preliminary braking signal is directly inputted to the main conversion device, and the main conversion device in which the preliminary braking signal is inputted energizes the main electric motor.

7. A brake control system for a railway vehicle using automatic train control comprising:
   an automatic train control (ATC) device configured to output a braking command to a brake controller based on the automatic train control, the braking command configured to cause the brake controller to output a braking signal configured to cause a main electric motor to regeneratively brake the railway vehicle, wherein the ATC device is further configured to output a preliminary braking signal configured to energize the main electric motor for regenerative braking prior to outputting the braking command.

8. The brake control system according to claim 7, further comprising the main electric motor.

9. The brake control system according to claim 8, further comprising a main conversion device, the main conversion device comprising a controller configured to adjust an amount of electric power generated by the main electric motor, to thereby control the regenerative braking of the main electric motor.

10. The brake control system according to claim 9, further comprising the brake controller, the brake controller configured to output the braking signal to the main conversion device.

11. The brake control system according to claim 8, wherein after receiving the preliminary braking signal and prior to the braking signal causing the main electric motor to regeneratively brake the railway vehicle, said main electric motor is enabled to cause regenerative braking upon receipt of the braking signal.

12. The brake control system according to claim 7, wherein a preceding time is defined as an amount of time between when the preliminary braking signal is output and when the braking command is output to the brake controller, the preceding time being more than an amount of time required for activating the regenerative braking.

13. The brake control system according to claim 12, wherein the preceding time is based on, at least in part, a predetermined amount of time.

14. The brake control system according to claim 13, wherein the preceding time is between about 1 to about 2 seconds.

15. The brake control system according to claim 12, wherein the preceding time is based on, at least in part, a distance of the railway vehicle will travel to a location where the braking command is to be output.

16. The brake control system according to claim 12, wherein the preceding time is based on, at least in part, a speed of the railway vehicle when the braking command is to be output.

17. The brake control system according to claim 12, wherein the brake signal is inputted from the brake controller to the main conversion device in response to receipt of the preliminary braking signal.

18. A brake control system for a railway vehicle using automatic train control comprising:
   a main electric motor configured to regeneratively brake the railway vehicle in response to a braking signal; and
   an automatic train control (ATC) device configured to output a preliminary braking signal, the preliminary braking signal being configured to energize the main electric motor for regenerative braking prior to the braking signal being generated.

19. The brake control system according to claim 18, wherein after receiving the preliminary braking signal and prior to the braking signal causing the main electric motor to regeneratively brake the railway vehicle, said main electric motor is enabled to cause regenerative braking upon receipt of the braking signal.

20. The brake control system according to claim 18, wherein a preceding time is defined as an amount of time between when the preliminary braking signal is output and when the braking command is output, the preceding time being more than an amount of time required for activating the regenerative braking.

* * * * *